United States Patent
Dong

(10) Patent No.: US 10,237,671 B2
(45) Date of Patent: Mar. 19, 2019

(54) SPEAKER VIBRATION ASSEMBLY AND ASSEMBLING METHOD THEREOF

(71) Applicant: Goertek.Inc, Shandong (CN)

(72) Inventor: Qingbin Dong, Shandong (CN)

(73) Assignee: Goertek Inc., Shandong (CN)

( * ) Notice: Subject to any disclaimer, the term of this patent is extended or adjusted under 35 U.S.C. 154(b) by 0 days.

(21) Appl. No.: 15/570,616

(22) PCT Filed: Dec. 16, 2015

(86) PCT No.: PCT/CN2015/097632
§ 371 (c)(1),
(2) Date: Oct. 30, 2017

(87) PCT Pub. No.: WO2016/176999
PCT Pub. Date: Nov. 10, 2016

(65) Prior Publication Data
US 2018/0288551 A1    Oct. 4, 2018

(30) Foreign Application Priority Data
May 5, 2015   (CN) .......................... 2015 1 0224642

(51) Int. Cl.
*H04R 7/16*   (2006.01)
*H04R 31/00*  (2006.01)
*B29C 65/54*  (2006.01)
*B29L 31/38*  (2006.01)

(52) U.S. Cl.
CPC ........... *H04R 31/006* (2013.01); *B29C 65/54* (2013.01); *H04R 7/16* (2013.01); *H04R 31/00* (2013.01); *B29L 2031/38* (2013.01)

(58) Field of Classification Search
CPC ....... B29C 65/54; B29L 2031/38; H04R 7/16; H04R 31/006
See application file for complete search history.

(56) References Cited

U.S. PATENT DOCUMENTS

2013/0043090 A1* 2/2013 Akino ................. H04R 7/125
181/174

FOREIGN PATENT DOCUMENTS

| CN | 103024638 | 4/2013 |
| CN | 203748003 | 7/2014 |
| CN | 104811878 | 7/2015 |
| CN | 204559874 | 8/2015 |

OTHER PUBLICATIONS

International Search Report and Written Opinion of International Searching Authority for International Patent Application No. PCT/CN2015/097632, dated Feb. 14, 2016, with English translation of International Search Report, 8 pages.

* cited by examiner

*Primary Examiner* — Brian Ensey
(74) *Attorney, Agent, or Firm* — Alston & Bird LLP

(57) ABSTRACT

A speaker vibration assembly is provided, comprising: a voice coil, a reinforcement part and a diaphragm, wherein the diaphragm is provided with a central part. The voice coil and the reinforcement part are respectively pasted on two surfaces of the central part, and the central part is provided with a through hole for adhering configured to accommodate an adhesive applied to the surfaces of the diaphragm. In addition, an assembling method of a speaker vibration assembly is provided.

12 Claims, 5 Drawing Sheets

SPEAKER VIBRATION ASSEMBLY AND ASSEMBLING METHOD THEREOF

CROSS-REFERNCE TO RELATED APPLICATIONS

This application is a National Stage Application, filed under 35 § 371, of International Application No. PCT/CN2015/097632, filed on Dec. 16, 2015, which international application claims priority to Chinese Patent Application No. 20151022464.4, filed on May 5, 2015, the contents of both of which are hereby incorporated by reference in their entireties.

BACKGROUND

Related Arts

The present invention relates to the field of acoustic-electric transduction, and in particular, to a speaker vibration assembly and a manufacturing method thereof.

Description of Related Art

Micro-speakers are indispensable sound generating apparatuses in modern electronic equipment. As people put forward higher requirements on sound quality of the electronic equipment and the consumption quantity thereof increases, the performance of vibration assemblies and magnetic circuit systems of speakers need to be improved. Manufacturing processes of the vibration assemblies and the magnetic circuit systems of the speakers are also required to be more efficient and reliable.

In an existing moving coil speaker structure, a vibration assembly typically comprises a voice coil, a diaphragm and a reinforcement part. The voice coil and the reinforcement part are generally connected to two surfaces of the diaphragm in an adhered manner. In a general manufacturing process, one surface of the diaphragm is coated with an adhesive first, then the reinforcement part is pasted on this surface, and a solidification operation is carried out; and then the other surface of the diaphragm is coated with the adhesive, the voice coil is pasted on this surface, and another solidification operation is carried out. However, this manufacturing process requires twice application of the adhesive and solidification operations, so that the efficiency is relatively low. In addition, since the adhesive has a certain volume and fluidity, the adhesive previously applied onto the diaphragm usually overflows from edges of the reinforcement part and the voice coil when the reinforcement part is pressed against the diaphragm and the voice coil is pressed against the diaphragm, and then flows to a corrugated rim of the diaphragm or a side wall of the voice coil. The overflowed adhesive is likely to cause the diaphragm to fail or cause the voice coil to not vibrate smoothly in a magnetic circuit system.

In summary, as the structure and the manufacturing process of the existing micro moving coil speaker are flawed, it is necessary to provide an improved scheme in which the manufacture of the vibration assembly is free from an adhered manner or repeated application of the adhesive and solidification are avoided and overflow of the adhesive is prevented.

BRIEF SUMMARY

An object of the present invention is to provide a speaker vibration assembly for preventing overflow of an adhesive. According to an aspect of the present invention, there is provided a speaker vibration assembly, comprising: a voice coil, a reinforcement part and a diaphragm, wherein the diaphragm is provided with a central part; and the voice coil and the reinforcement part are respectively pasted on two surfaces of the central part, and the central part is provided with an through hole for adhering.

Preferably, the through hole for adhering may be distributed at a position where the voice coil is in contact with the central part.

The reinforcement part may be provided with a makeway part corresponding to the through hole for adhering in position. Specifically, when the through hole for adhering is distributed at the position where the voice coil is in contact with the central part, the makeway part may also correspond to the through hole for adhering in position.

The makeway part may be an edge-thinned part located at an edge of the reinforcement part; or, the makeway part may also be a groove located on the surface of the reinforcement part. Preferably, the makeway part may be provided with a supporting tab.

Another object of the present invention is to provide a simple assembling manner of a vibration assembly. According to an object of the present invention, there is provided an assembling method of a speaker vibration assembly, the method comprising: step 1, providing a diaphragm, a reinforcement part and a voice coil, wherein the diaphragm comprises a central part on which a pasting tape in contact with the voice coil is arranged, and an through hole for adhering is formed in the central part; step 2, stacking the reinforcement part and the diaphragm in a positioned manner, wherein the reinforcement part corresponds to the central part, and the reinforcement part covers the through hole for adhering; step 3, coating the pasting tape and the through hole for adhering with an adhesive; step 4, placing the voice coil on the pasting tape to constitute the speaker vibration assembly; and step 5, solidifying the adhesive.

Preferably, before step 1, the assembling method comprises: forming a makeway part on the reinforcement part, wherein when the reinforcement part and the diaphragm are stacked in a positioned manner, the makeway part and the through hole for adhering are corresponding to each other in position.

Specially, the step 1 comprises: forming the through hole for adhering in the pasting tape.

A technical effect of the present invention is that the adhesive is prevented form overflowing by forming the through hole for adhering in the central part of the diaphragm to accommodate the adhesive applied onto the surfaces of the central part; and the stability of adhesive assembling is improved as the solidification of the adhesive in the through hole for adhering can provide more reliable structural stability for the reinforcement part and the voice coil. Another technical effect of the present invention is that by forming the through hole for adhering, in an assembling process of the vibration assembly, the reinforcement part and the voice coil can be pasted on the central part of the diaphragm only through once application of the adhesive and the solidification operation.

Further features of the present invention and advantages thereof will become apparent from the following detailed description of exemplary embodiments according to the present invention with reference to the attached drawings.

DETAILED DESCRIPTION OF VARIOUS EMBODIMENTS

Figure 1:
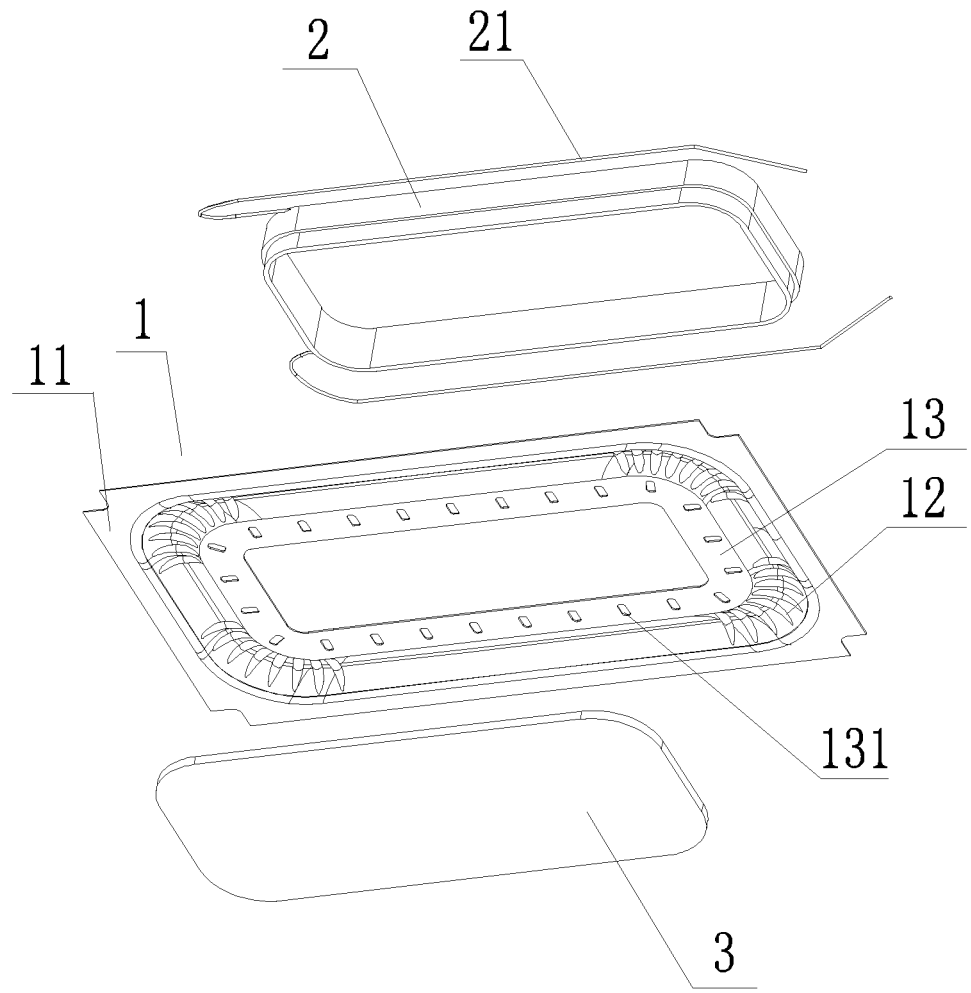
FIG. 1 is an exploded view of parts of a speaker vibration assembly in a specific embodiment of the present invention.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the present invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it does not need to be further discussed in the accompanying drawings.

The present invention provides a speaker vibration assembly, at least comprising: a voice coil, a reinforcement part and a diaphragm. The diaphragm is provided with a plane part, a corrugated rim part and a central part. The voice coil and the reinforcement part are respectively pasted on two planes of the central part. The plane part is configured to be fixedly connected with other parts of a speaker. The corrugated rim part provides a sufficient vibration space and a hanging force for the reinforcement part and the voice coil on the central part. Specially, the central part is provided with a plurality of hollowed-out through holes for adhering configured to accommodate the adhesive applied onto the diaphragm. The through holes for adhering may be uniformly distributed on the central part, for example, in the form of a matrix arranged on the central part, or in the form of a circle of equally-spaced through holes for adhering formed at positions close to the edge of the central part. The central part of the diaphragm may be a complete planar diaphragm, or may be an annular central part hollowed-out in the middle portion and only having a certain width. Those skilled in the art can set a plurality of through holes for adhering distributed in different forms on the central part according to different structures of the central part. Since the central part of the diaphragm is provided with the through holes for adhering, only once application of the adhesive onto one surface of the central part is required, and the adhesive can flow to the other surface of the central part via the through holes for adhering. In addition, as the adhesive has certain viscosity, a part of adhesive will remain in the through holes for adhering, enhancing the adhesive effect. On the other hand, the through holes for adhering provide a certain flow space for the adhesive; and when the reinforcement part and the voice coil are pressed against the diaphragm, the adhesive does not directly overflow from two sides of the reinforcement part and the voice coil, avoiding damage to a device caused by the overflow of the adhesive. Most of the adhesive will flow into the through holes for adhering to form an adhesive layer in the through holes for adhering, effectively improving the pasting reliability.

In addition, for different vibration assemblies, those skilled in the art may use different adhesives; and there are differences in fluidity and viscosity among different adhesives. Therefore, the shape of the through holes for adhering may be designed according to the property of an adhesive to be used, so that the adhesive can more easily penetrate to the two sides of the central part from the through holes for adhering to form an adhesive layer. For example, the shape of the through holes for adhering may be rectangular, cross-shaped, or the like. The present invention does not limit the shape of the through holes for adhering, and the shape can be designed by a person skilled in the art according to an actual situation.

Figure 2:
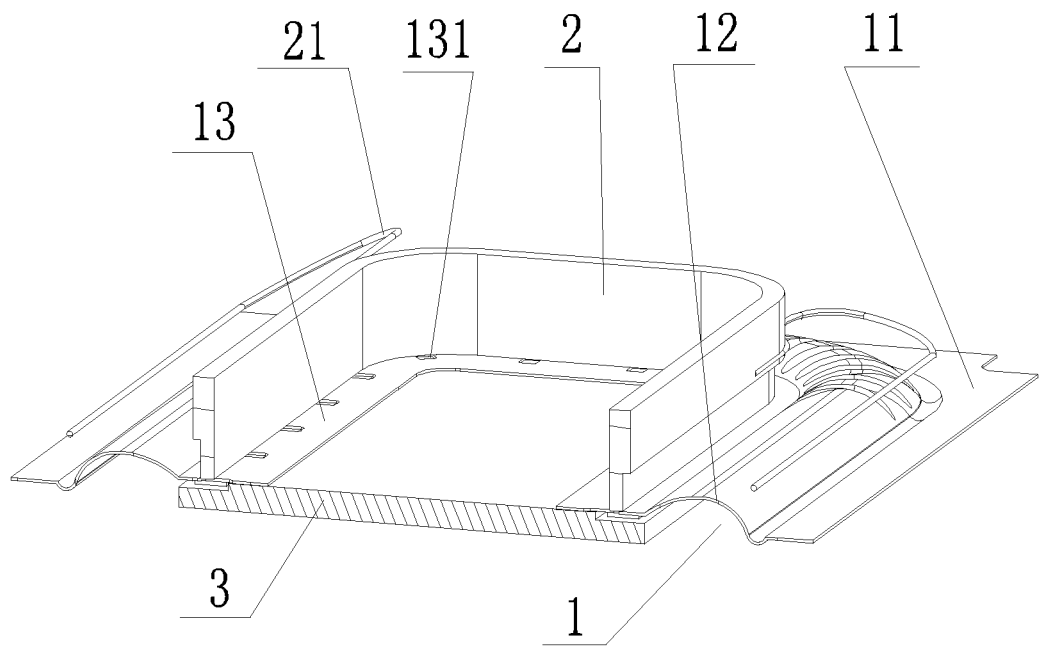
FIG. 2 is a structural section view of a speaker vibration assembly in a specific embodiment of the present invention.

In a specific embodiment, as shown in FIG. 1, the central part 13 of the diaphragm 1 is of an annular structure with a hollowed-out middle portion; a plurality of equally-spaced through holes for adhering 131 is distributed along the annular surface of the central part 13; the through holes for adhering 131 are distributed in an annular form; and the shape of the through holes for adhering 131 is rectangular. The through holes for adhering 131 may be close to an inner edge of the central part 13, or located at an edge, close to a corrugated rim part 12, of the central part 13. The positions of the through holes for adhering 131 may be designed according to the sizes of both the voice coil 2 and the reinforcement part 3. Specially, in the embodiment of the present invention, the positions of the through holes for adhering 131 on the central part 13 are the same as the position where the voice coil 2 is pasted on the central part 13. That is, as shown in FIG. 2, when being pasted on the central part 13, the voice coil 2 is in contact with the through holes for adhering 131. This structural feature has the advantage that when the central part 13 is coated with the adhesive, all that is needed is to apply the adhesive to an annular band formed by the through holes for adhering 131. A part of the adhesive is adhered onto the surface so as to adhere the voice coil 2, and the other part of the adhesive flows into the through holes for adhering 131 to be penetrated to the other side surface of the central part 13 so as to adhere the reinforcement part 3.

Figure 3:
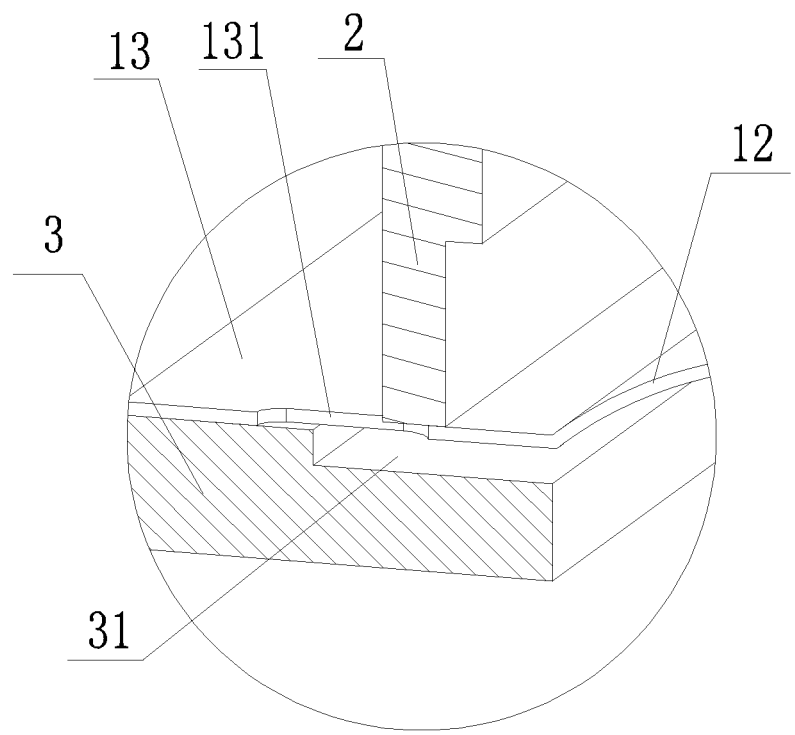
FIG. 3 is a partially enlarged section view of a makeway part and an through hole for adhering in a specific embodiment of the present invention.
Figure 5:
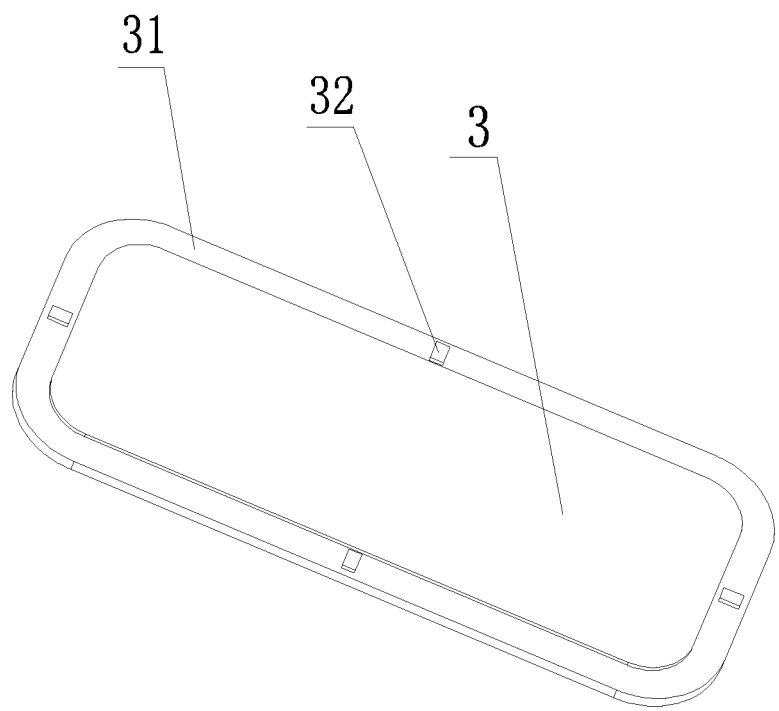
FIG. 5 is a structural diagram of a reinforcement part in a specific embodiment of the present invention.

Preferably, as shown in FIGS. 2 and 3, the reinforcement part 3 may be provided with a makeway part 31. The makeway part 31 corresponds to the through holes for adhering 131 in position. That is, when the reinforcement part 3 is mounted on the central part 13, the makeway part 31 forms a certain space between the central part 13 and the reinforcement part 3. In the present embodiment, as shown in FIGS. 3 and 5, the multiple through holes for adhering 131 are distributed in an annular form, so that the makeway part 31 is mounted on the reinforcement part 3 in an annularly strip-shaped form, and corresponds to the through holes for adhering 131 in position. As shown in FIGS. 3 and 5, based on the structure, the makeway part 31 may form a pressed edge at the edge of the reinforcement part 3, and may form a groove on the surface of the reinforcement part 3. The shape and the structure of the makeway part 31 may be designed according to factors such as the size and the pasting position of the reinforcement part 3, as well as the distribution characteristic of the through holes for adhering 131 and the like; and the present invention does not limit the shape and the structure of the makeway part 31. For example, in the present embodiment, since an area of the reinforcement part 3 is substantially equal to that surrounded by the outer edge of the central part 13, and the through holes for adhering 131 are distributed on the annular central part 13, the positions of the through holes for adhering 131 are close to the edge of the reinforcement part 3, and the makeway part 31 is formed on the reinforcement part 3 by pressing the edge thereof to be thinner. In other cases, for example, when the middle portion of the central part 13 is not hollowed-out and the through holes for adhering 131 are distributed at the central portion of the central part 13, the makeway part 31 may be arranged at the center of the reinforcement part 3 by forming a groove on the surface of the makeway part 31.

The reinforcement part 3 with the makeway part 31 has the following advantages. On one hand, when the adhesive applied to one side surface of the diaphragm 1 on which the voice coil 2 is pasted penetrates to the surface, on which the reinforcement part 3 is pasted, of the diaphragm 1 through the through holes for adhering 131, it can be gathered in the makeway part 31 to adhere the bottom surface and the side surface of the makeway part 31, enhancing an adhesion effect of the reinforcement part 3. After being pasted, the reinforcement part 3 having the makeway part 31 is higher in structural stability. On the other hand, as the makeway part 31 provides a space for accommodating the adhesive, excess adhesive will not overflow from the edges of the reinforcement part 3 and the voice coil 2 in an adhering and pressing process among the reinforcement part 3, the voice coil 2 and the diaphragm 1, avoiding the influence on the performance of the corrugated rim part 12 and the shape of the voice coil 2. The excess adhesive is gathered in the makeway part 31, so that the pasting stability of the reinforcement part 3 can be enhanced.

Figure 4:
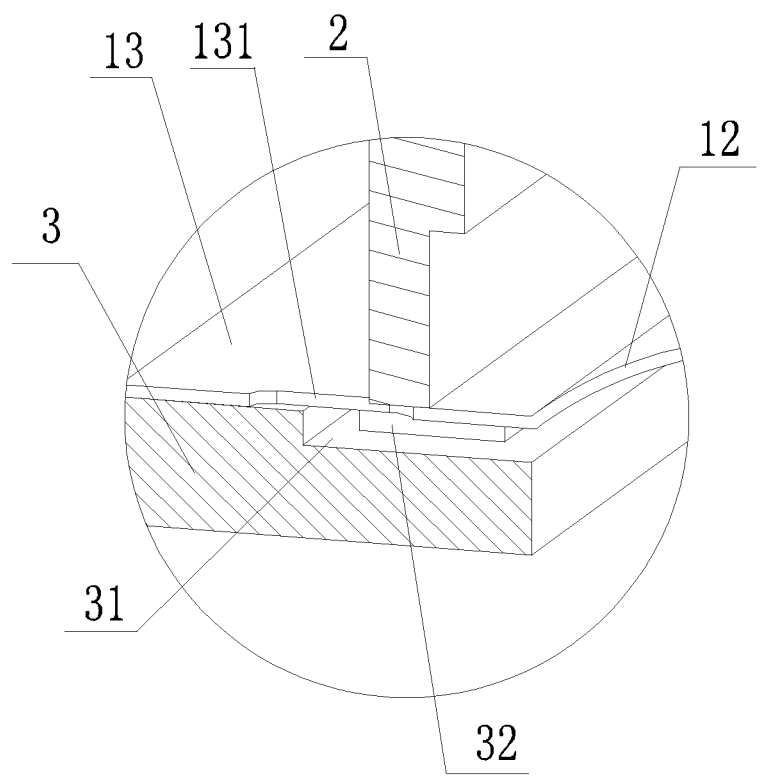
FIG. 4 is an enlarged section view of a makeway part, an through hole for adhering and a supporting tab in a specific embodiment of the present invention.

Specially, when the reinforcement part 3 is provided with the makeway part 31, and the positions of the through holes for adhering 131 correspond to the position where the voice coil 2 is pasted, the structural characteristics can not only remarkably improve the pasting stability, but also greatly simplifies the assembling process of the vibration assembly. However, since the voice coil 2, the through holes for adhering 131 and the makeway part 31 are at the same position, the position, where the voice coil 2 is pasted, on the central part 13 is not in direct contact with the reinforcement part 3, and the through holes for adhering 131 and the makeway part 31 form a certain space, as shown in FIG. 3. When the vibration assembly works, vibration generated by the voice coil 2 cannot be directly transmitted to the reinforcement part 3 without the central part 13. As a result, the central part 13 may be bent, or the vibration of the diaphragm 1 cannot be completely synchronous with that of the voice coil 2, thereby affecting the sound quality of the speaker. Thus, as shown in FIGS. 4 and 5, the makeway part 31 may be provided with supporting tabs 32; when the reinforcement part 3 is pasted on the central part 13, the supporting tabs 32 are in contact with the central part 13 to support the makeway part 31; and the vibration generated when the voice coil 2 works may be directly transmitted to the reinforcement part 3 through the supporting tabs 32. In this embodiment, there are four supporting tabs 32 in the makeway part 31, and the four supporting tabs are respectively arranged at middle points of four sides of the rectangular annular avoiding part 31. The present invention does not limit the shape, the number and the distribution characteristic of the supporting tabs 32. Those skilled in the art can design the positions and the number of the supporting tabs 32 according to an actual situation so long as the supporting tabs 32 may be capable of playing a supporting role sufficiently.

Figure 6:
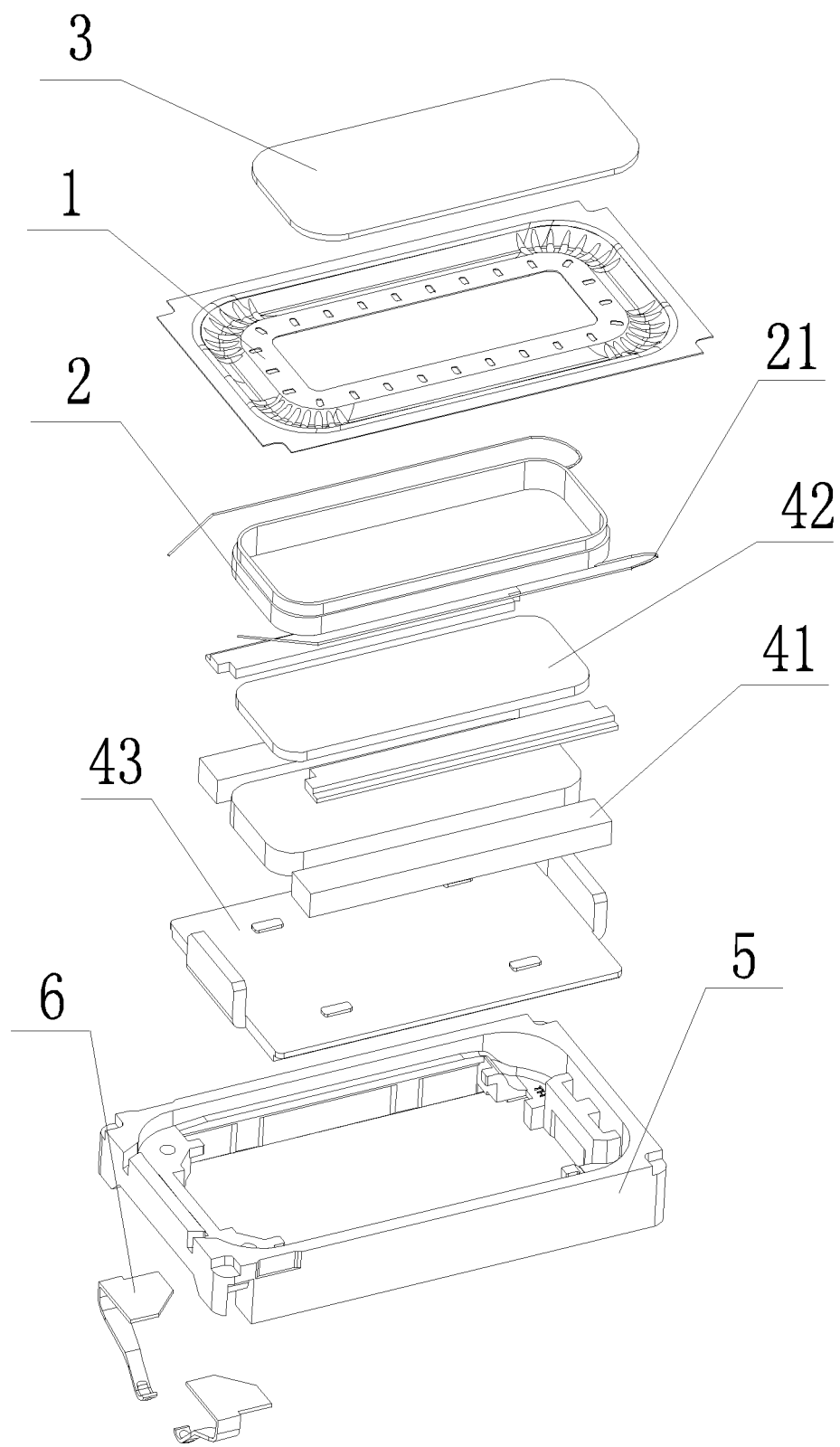
FIG. 6 is an exploded view of parts of a speaker structure in a specific embodiment of the present invention.
Figure 7:
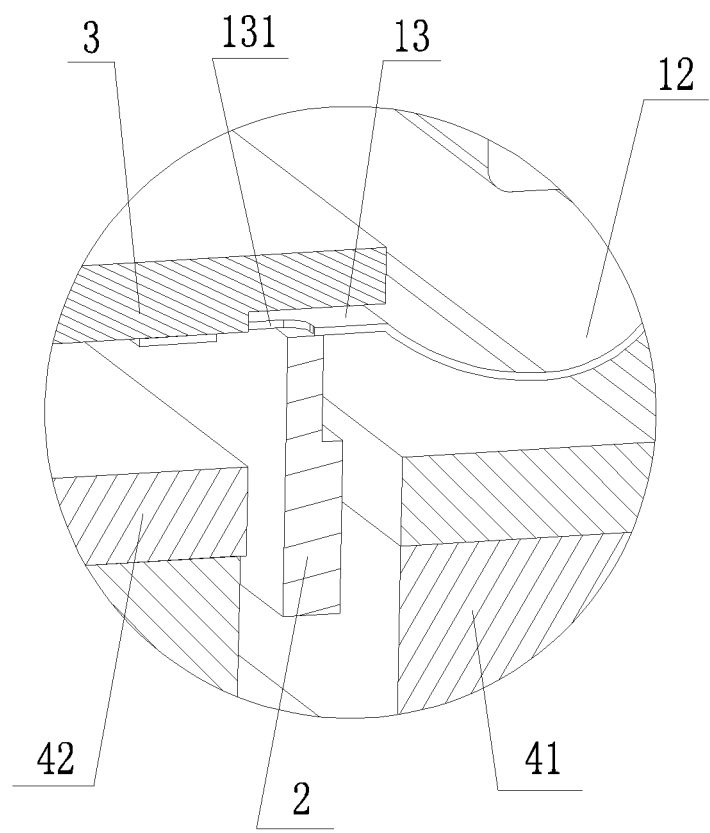
FIG. 7 is a partially enlarged section view of a speaker structure in a specific embodiment of the present invention.

The present invention further provides a speaker structure using the above-described vibration assembly. The speaker structure comprises the above-described vibration assembly, a magnetic circuit system, a shell 5 and an elastic sheet 6, as shown in FIG. 6. The vibration assembly is mounted on the shell 5 through a plane part 11 of the diaphragm 1, and further comprises a voice coil wire lead 21 which is led out from the voice coil 2 to transmit a sound signal. The elastic sheet 6 is mounted on the shell 5, and the voice coil lead 21 is electrically connected with the elastic sheet 6. The magnetic circuit system is mounted in the shell 5, and comprises a magnet 41, a washer 42 and a basin frame 43. There is a magnetic gap in the magnetic circuit system, and the voice coil 2 is suspended in the magnetic gap. When there is a sound signal passing through the voice coil 2, the voice coil 2 vibrates under the action of a magnetic field, so as to drive the diaphragm 1 to vibrate to produce a sound. FIG. 7 is a partial section view of a speaker structure provided by the present invention. An through hole for adhering 131 in the central part 13 prevents damages to a device caused by the overflow of the adhesive, and the adhesive cannot overflow to a corrugated rim part 12 from the side surface of the central part 13.

In another aspect, the present invention further provides an assembling method of a vibration assembly. The assembling method comprises the following steps.

In step 1, a diaphragm 1, a reinforcement part 3 and a voice coil 2 are provided. As shown in FIG. 1, the diaphragm 1 comprises a plane part 11, a corrugated rim part 12 and a central part 13. The central part 13 is provided with a pasting tape in contact with the voice coil 2, and an through hole for adhering 131 is formed in the central part 13. During manufacture of the diaphragm 1, a position of the voice coil 2 on the central part 13 is preset on one surface of the central part 13, and the through hole for adhering 131 is formed. The position where the voice coil 2 is in contact with the central part 13 serves as a position of the pasting tape, and the application of the adhesive is required at that position. The other surface of the central part 13 serves as a surface on which the reinforcement part 3 is pasted.

In step 2, the reinforcement part 3 and the diaphragm 1 are stacked in a positioned manner, wherein the reinforcement part 3 corresponds to the central part 13 and covers the through hole for adhering 131. In step 2, the reinforcement part 3 is placed below, and the diaphragm 1 is placed above the reinforcement part 3; the surface, on which the reinforcement part 3 is pasted, of the diaphragm is opposed to the reinforcement part 3; and the diaphragm and the reinforcement part are positioned, and the opposite positions are the assembling positions.

In step 3, the pasting tape and the through hole for adhering 131 are coated with an adhesive. In step 3, the adhesive is applied to the pasting tape and the through hole for adhering 131, and the adhesive will penetrate into a space between the reinforcement part 3 and the diaphragm 1 from the through hole for adhering 131. If the position of the through hole for adhering 131 is the same as that of the pasting tape, it is only necessary to apply the adhesive to the through hole for adhering 131. If the position of the through hole for adhering 131 is different from that of the pasting tape, it is necessary to apply the adhesive to both the pasting tape and the through hole for adhering 131.

In step 4, the voice coil 2 is placed on the pasting tape in a positioned manner and is in contact with the adhesive. The speaker vibration assembly as shown in FIG. 2 is formed by combing the reinforcement part 3 at the lower portion, the diaphragm 1 in the middle and the voice coil 2 at the upper portion.

In step 5, the adhesive is solidified, and the assembled speaker vibration assembly is placed into a solidifying device, and the adhesive applied to the diaphragm 1 is solidified to allow the reinforcement part 3, the diaphragm 1 and the voice coil 2 are formed in a fixed manner.

Preferably, before step 1, the assembling method further comprises: forming a makeway part 31 on the reinforcement part 3 by edge-thinning, etching, or the like. When the reinforcement part 3 and the diaphragm 1 are stacked in a positioned manner, the makeway part 31 and the through hole for adhering 131 are corresponding to each other in position.

Preferably, in step 1, the through hole for adhering 131 is formed in the pasting tape, such that the position of the through hole for adhering 131 is the same as that of the pasting tape.

Although certain specific embodiments of the present invention have been described in detail by examples, it will be understood by those skilled in the art that the above examples are only intended to be illustrative but not to limit the scope of the present invention. It should be understood by those skilled in the art that the above embodiments can be modified without departing from the scope and spirit of the present invention.

What is claimed is:

1. A speaker vibration assembly, comprising:
    a voice coil;
    a reinforcement part; and
    a diaphragm,
    wherein:
        the diaphragm is provided with a central part;
        the voice coil and the reinforcement part are respectively pasted onto two surfaces of the central part, the central part being provided with an through hole for adhering; and
        the through hole for adhering is distributed at a position where the voice coil is in contact with the central part.

2. The speaker vibration assembly of claim 1, wherein:
    the reinforcement part is provided with a makeway part, and
    the makeway part and the through hole for adhering are corresponding to each other in position.

3. The speaker vibration assembly of claim 2, wherein the makeway part is an edge-thinned part located at the edge of the reinforcement part.

4. The speaker vibration assembly of claim 2, wherein the makeway part is a groove located on the surface of the reinforcement part.

5. The speaker vibration assembly of claim 2, wherein the makeway part is provided with a supporting tab.

6. An assembling method of a speaker vibration assembly, the method comprising:
    step 1, providing a diaphragm, a reinforcement part and a voice coil, wherein the diaphragm comprises a central part on which a pasting tape in contact with the voice coil is arranged, and an through hole for adhering is formed in the central part;
    step 2, stacking the reinforcement part and the diaphragm in a positioned manner, wherein the reinforcement part corresponds to the central part, and the reinforcement part covers the through hole for adhering;
    step 3, coating the pasting tape and the through hole for adhering with an adhesive;
    step 4, placing the voice coil on the pasting tape to constitute the speaker vibration assembly; and
    step 5, solidifying the adhesive.

7. The assembling method of the speaker vibration assembly of claim 6, further comprising:
    forming a makeway part on the reinforcement part before step 1, wherein when the reinforcement part and the diaphragm are stacked in a positioned manner, the makeway part and the through hole for adhering are corresponding to each other in position.

8. The assembling method of the speaker vibration assembly of claim 6, wherein step 1 further comprises forming the through hole for adhering in the pasting tape.

9. A speaker vibration assembly, comprising:
    a voice coil;
    a reinforcement part having a makeway part; and
    a diaphragm having a central part,
    wherein:
        the voice coil and the reinforcement part are respectively pasted onto two surfaces of the central part, the central part being provided with an through hole for adhering; and
        the makeway part and the through hole for adhering are corresponding to each other in position.

10. The speaker vibration assembly of claim 9, wherein the makeway part is an edge-thinned part located at the edge of the reinforcement part.

11. The speaker vibration assembly of claim 9, wherein the makeway part is a groove located on the surface of the reinforcement part.

12. The speaker vibration assembly of claim 9, wherein the makeway part is provided with a supporting tab.

* * * * *